US006851763B1

(12) United States Patent          (10) Patent No.:     US 6,851,763 B1
    Feigel                         (45) Date of Patent:      Feb. 8, 2005

(54) HYDRAULIC BRAKE SYSTEM (75) Inventor: Hans-Jörg Feigel, Rosbach (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 63 days.

(21) Appl. No.: 10/031,981

(22) PCT Filed: Jul. 27, 2000

(86) PCT No.: PCT/EP00/07233

§ 371 (c)(1),
(2), (4) Date: Jun. 23, 2002

(87) PCT Pub. No.: WO01/07307

PCT Pub. Date: Feb. 1, 2001

(30) Foreign Application Priority Data

Jul. 28, 1999  (DE) .......................... 199 34 808
Jul. 28, 1999  (DE) .......................... 199 34 807
Jul. 28, 1999  (DE) .......................... 199 34 802

(51) Int. Cl.$^7$ ............... B60T 8/44; B60T 8/40; B60T 11/00

(52) U.S. Cl. ................ 303/114.1; 303/116.1; 188/358

(58) Field of Search ............... 303/11, 113.4, 303/114.1, 114.2, 116.1; 188/358, 359, 360

(56) References Cited

U.S. PATENT DOCUMENTS 5,039,175 A * 8/1991 Holzmann et al. ..... 303/122.01
5,758,930 A * 6/1998 Schiel et al. ............. 303/113.4

FOREIGN PATENT DOCUMENTS

| DE | 39 03 532  | 8/1989  |
| DE | 196 43 343 | 4/1998  |
| DE | 197 16 404 | 10/1998 |
| EP | 0 774 391  | 5/1997  |
| GB | 21 732 70  | 10/1986 |

* cited by examiner

Primary Examiner—Jack Lavinder
Assistant Examiner—Xuan Lan Nguyen
(74) Attorney, Agent, or Firm—Honigman Miller Schwartz and Cohn LLP (57) ABSTRACT A hydraulic brake system for vehicles with a brake pressure generator unit which is operable by introducing an actuating force by way of an actuating device that includes a first hydraulic chamber having a volume which decreases when the brake pressure generator unit is actuated, out of which pressure fluid volume is displaced due to the volume decrease and to which wheel brakes are connected by way of a first hydraulic connection, wherein a pump is arranged which is capable of delivering the pressure fluid volume displaced out of the first hydraulic chamber due to the volume decrease into the wheel brakes. The first hydraulic chamber includes an elastic device by which a force/travel characteristic curve is determined in the actuating device when an actuating force is introduced.

6 Claims, 8 Drawing Sheets

HYDRAULIC BRAKE SYSTEM

TECHNICAL FIELD

The present invention relates to a hydraulic brake system for vehicles with a brake pressure generator unit which is operable by introducing an actuating force by way of an actuating device that includes a first hydraulic chamber having a volume which decreases when the brake pressure generator unit is actuated, out of which pressure fluid volume is displaced due to the volume decrease and to which wheel brakes are connected by way of a first hydraulic connection, wherein a pump is arranged which is capable of delivering the pressure fluid volume into the wheel brakes that is displaced out of the first hydraulic chamber due to the volume decrease.

BACKGROUND OF THE INVENTION

Hydraulic brake systems with hydraulic boosters gain in usage in technical engineering. This applies in particular to boosters in automotive vehicles where an objective is that the boosters being mounted have a very compact design. In addition, the vacuum boosters previously used in practice are frequently no longer applicable effectively because they require considerable space and do not provide the vacuum needed for boosting in modern vehicles.

Hydraulic boosters known from the art are either comparatively complicated and permit an only relatively inaccurate control, or they cause considerable reactions to the actuating device, e.g., the brake pedal, and hence impart an uncomfortable pedal feeling to the driver.

BRIEF SUMMARY OF THE INVENTION

An object of the present invention is to overcome the shortcomings of brake systems of this type and to reduce reactive effects of the hydraulic pressure increase or pressure decrease on the actuating device.

This object is achieved by the combination of features to be gathered from the characterizing portion of claim 1.

Thus, the present invention principally involves arranging a pump in the first hydraulic connection between the first hydraulic chamber of a brake pressure generator unit and the wheel brakes, the said pump delivering the pressure fluid volume into the wheel brakes which is displaced out of the first hydraulic chamber when an actuating force of the actuating device is introduced, and arranging an elastic means in the first hydraulic chamber, for reproducing a conventional volume-pressure characteristic curve of wheel brakes and, thus, for producing a force-travel characteristic curve or a force-stroke characteristic curve which imparts a customary and comfortable pedal feeling to the driver when a brake pedal is used as the actuating device.

The pump causes a difference in pressure between the first hydraulic chamber and the wheel brakes by delivering the displaced volume out of the first hydraulic chamber of the brake pressure generator unit. Thus, the pressure in the first hydraulic chamber is advantageously adjusted to pressures near zero bar by means of a pump of a basically continuous delivery. The result is that the driver mainly feels only the effect of the elastic means; the reactive effect on the actuating device, in particular, a pedal reaction of the brake pressure that developed on the wheel brakes is greatly reduced.

Another advantage can be seen in the design of the brake system which is relatively simple under technical aspects. Basically, only one pump is required in this arrangement for the application of brake pressure to the wheel brakes. In addition, the pump may be precharged by the volume displacement out of the first hydraulic chamber by means of the actuating force of the driver, which is a major improvement of the brake operation and, also, a precondition for a reliable operation at low temperatures. The system is technically straightforward and, hence, inexpensive because no additional accumulator is needed in the brake system of the present invention.

Further, there is no longer a direct basic relationship between the force-stroke characteristic curve of the actuating device and the volume-pressure characteristic curve because force and pressure or, respectively, volume and travel are principally adjustable independently of one another. This basically permits configuring the boosting characteristics of the brake system as it is desired.

According to the present invention, a positive-displacement pump, preferably, a positive-displacement pump of continuous delivery, is used as a pump. The inlet pressure is boosted by a connected electric motor to an extent until the outlet pressure at the pump corresponds to the desired boosted pressure. It is especially favorable in a pump of this type that pressure increase is achieved with little pulsations and at low noise. Advantageously, the boosting characteristics is freely selectable due to a corresponding design and control of the pump. Medium refraction does not occur within the entire control circuit because both the brake pressure generator unit and the actuating circuits of the wheel brakes operate hydraulically. Geared pumps, vane-type pumps, and spindle pumps, however, especially pumps with an internal geared wheel, have proved well suited as variable-displacement pumps of continuous delivery.

The pump is favorably driven by an electric motor, preferably, a non-brush, permanently excited direct-current motor. Further, the said motor may be running with no load when brake pressure is not required so that start-up of the motor is usually not necessary when brake pressure is needed.

According to the present invention, the pump may be a pump with suction control or suction throttling. In a suction-controlled/suction-throttled pump, the pressure generated by the pump is controlled by the pressure fluid volume flow that is input at the suction side of the pump. This type of pump actuation is relatively easy to realize and good to control compared to a clocked actuation. The suction control of the pump provides the advantage that the energy is optimally used because the pump is loaded only to a degree that is just required for pressure increase.

The pump may also be configured as a bidirectionally delivering or reversing pump according to the present invention, permitting both a pressure increase in the direction of the wheel brakes and a pressure decrease of the pressure applied to the wheel brakes by the pump in an active manner.

According to the present invention, a second hydraulic connection is placed between the first hydraulic chamber and the wheel brakes and houses a valve, especially a control valve, by which the pressure fluid volume flow delivered by the pump is adjustable. This provision ensures a technically relatively simple and inexpensive adjustment of the desired brake pressure. It is especially favorable that the control valve has an analog operation. This renders possible a relatively straightforward design of the brake system of the present invention. On the one hand, the pressure may thus be in controlled very accurately and, on the other hand, an analog valve causes only relatively low noise.

According to this invention, there is provision of a non-return valve which is operable by the difference in pressure between the first hydraulic chamber and the wheel brakes and which opens the second hydraulic connection when excess pressure prevails in the first hydraulic chamber. It is thereby achieved that the volume displaced by the driver in a quick brake application is conducted out of the first hydraulic chamber directly, i.e., past the pump, into the wheel brake. This safeguards a quick brake effect in a period in which the pump, due to inertia effects, cannot contribute at all or only to a small degree.

The control valve is designed as a member of a hydraulic-mechanic position follow-up controller according to the present invention, with the valve position of this position follow-up controller being variable due to the deformation of the elastic means in the first hydraulic chamber. Thus, pressure control may take place advantageously without an electronic actuation of the valve.

A third hydraulic connection accommodating a second valve device is provided between the first hydraulic chamber and a pressure fluid supply reservoir. This favorably permits an aspiration of brake fluid out of the pressure fluid supply reservoir when the volume displaced from the first hydraulic chamber is smaller than the volume required for a defined, desired brake pressure.

According to the present invention, the brake pressure generator unit includes a master brake cylinder with at least one hydraulic chamber (master brake cylinder chamber), preferably, a tandem master brake cylinder with two hydraulic chambers, one master brake cylinder chamber thereof being connected by way of a hydraulic line to a second piston FA chamber in which the first hydraulic piston is designed as a separating piston, preferably a separating piston with a central valve, and whereby the elastic means that is arranged in the first hydraulic chamber can be acted upon by pressure force. The separating piston effects a hydraulic separation of the tandem master brake cylinder circuits from the third brake circuit, wherein the first hydraulic chamber is connected to the energy supply by the pump, to the connection to the pressure fluid supply reservoir by way of preferably the central valve, and to the rear-wheel brakes by way of preferably normally open valves, and is connectable to the front-wheel brakes of the vehicle by way of preferably normally closed valves. This separation is advantageous because upon failure of the brake system, that means upon failure of the power supply, the total stroke operation of the driver can be distributed to the pressurization of the front-axle wheel brakes by way of the tandem master brake cylinder circuits and the pressurization of the rear-axle wheel brakes by way of the third brake circuit. Thus, when the third brake circuit fails, this concerns only the rear axle, and failure of another brake circuit causes only failure of the front-axle wheel brakes. A great availability of the brake system is advantageously achieved thereby.

In a preferred embodiment of the present invention, the at least one master brake cylinder chamber, preferably two master brake cylinder chambers of a tandem master brake cylinder, is/are connected to two preferably front wheel brakes by way of at least one hydraulic line, preferably two hydraulic lines, into which an electronically operable valve is inserted, and there is provision of electronically operable valves between the first hydraulic chamber and the wheel brakes, and electronically operable valves are arranged between a fourth hydraulic line for the return of pressure fluid out of the wheel brakes. This renders the control of brake pressure easily possible.

According to the present invention, the at least one master brake cylinder chamber, preferably two hydraulic chambers of a tandem master brake cylinder, are connected to two preferably front wheel brakes by way of at least one hydraulic line, preferably two hydraulic lines, inserted into which is a separating valve, preferably each one electromagnetically operable, normally open separating valve. The first hydraulic chamber which includes an elastic means is connected to two preferably rear wheel brakes by way of the one line and succeeding line portions into which a separating valve, preferably one electromagnetically operable, normally open separating valve, is inserted, and the first hydraulic chamber which includes an elastic means is connectable to the two preferably front wheel brakes by way of a line and succeeding line portions, in which a separating valve, preferably each one electromagnetically operable normally closed separating valve is inserted. This renders a control of the brake pressure on each individual wheel easily possible.

According to the present invention, there is provision of a fourth hydraulic line which can be closed by way of separating valves, preferably electromagnetically operable, normally closed valves, and permits a return flow of pressure fluid from the wheel brakes into the pressure fluid supply reservoir, preferably by way of a master brake cylinder chamber, in one operating position. This allows a pressure decrease in a quick and reliable manner.

BRIEF DESCRIPTION OF THE DRAWINGS

In the drawings (FIGS. 1 to 8).

DETAILED DESCRIPTION OF THE PREFERRED EMBODIMENTS

Figure 1:
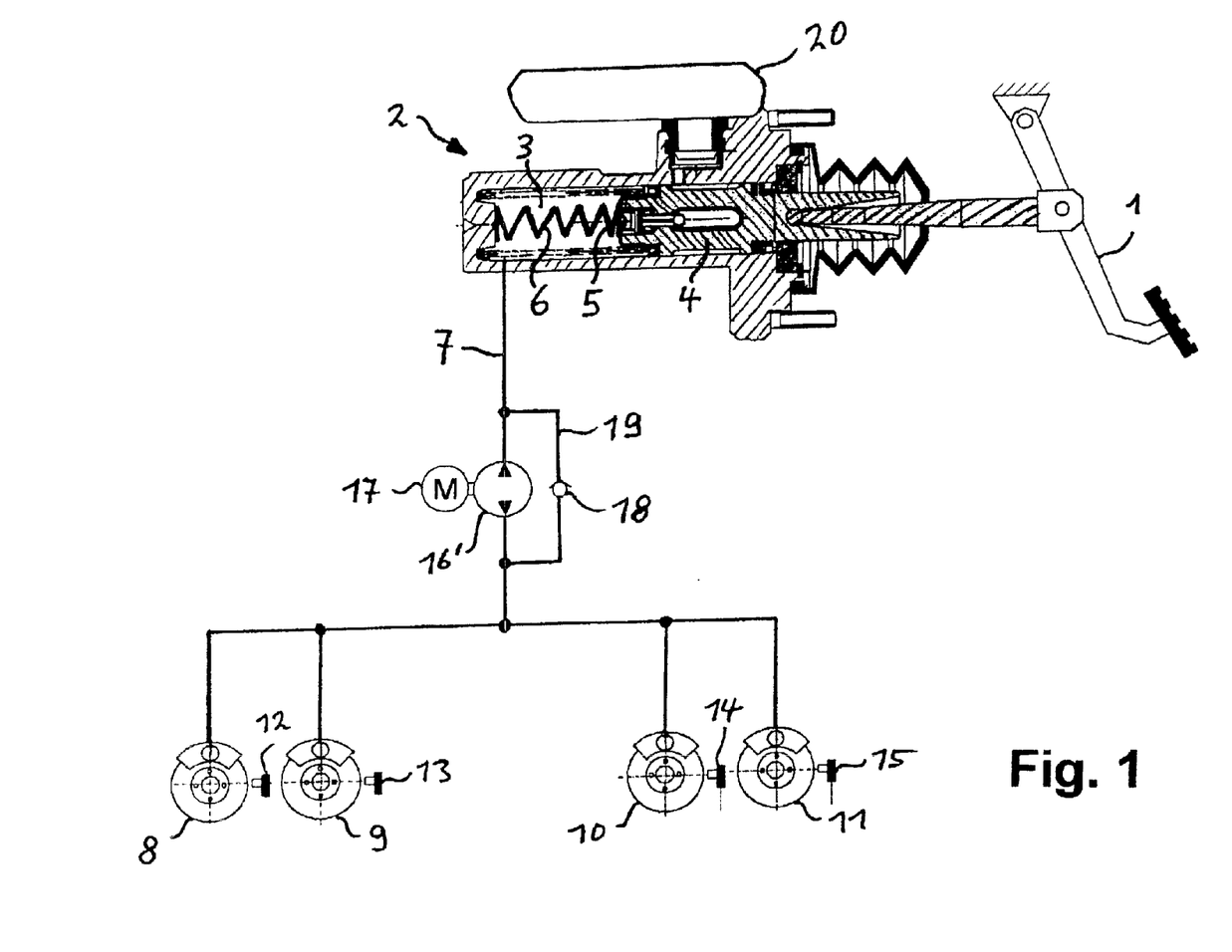
FIG. 1 is an embodiment of the brake system of the present invention including a first hydraulic chamber with an elastic means and a reversible pump.

The brake system illustrated in FIG. 1 is basically comprised of a brake pressure generator unit 2 that is operable by an actuating pedal 1 and has a first hydraulic chamber 3 which houses a first piston 4 with a central valve 5 and to which is assigned an elastic means, preferably a spring 6. By way of a first hydraulic line 7, the first hydraulic chamber 3 is connected to the wheel brakes 8, 9, 10, 11 associated with which are rotational speed sensors 12, 13, 14, 15 in this embodiment. Inserted into the first hydraulic line 7 is a pump which is configured as a bidirectional pump 16' herein and operated by a motor 17, and in parallel to which a non-return valve 18 is connected by way of a second hydraulic line 19. Further, the system includes a pressure fluid supply reservoir 20. For comprehending the present invention, further control valves for brake pressure control, as they are e.g. provided in an Anti-Lock Brake System (ABS) device, an Electronic Stability Program (ESP) device, or a Traction control System (TCS) are not absolutely necessary and have been omitted.

When the actuating pedal 1 is depressed, a force is applied to the piston 4, thereby generating a pressure in the first hydraulic chamber 3. The pressure fluid flows out of the first hydraulic chamber 3 via the connected hydraulic line 7 to the pump 16'. When the pump 16' is switched on, i.e., when the motor 17 is energized by a control device not shown in FIG. 1, it drives the pump 16'. With the help of pump 16', the inlet pressure is boosted and conducted from the outlet side of the pump 16' to the wheel brakes 8, 9, 10, 11 by way of the second line 19. In case the pump 16' is ineffective, the pressure generated in the pressure generator unit 2 can be applied directly to the wheel brakes 8, 9, 10, 11. This ensures an auxiliary braking function. It is arranged for that the motor 17 drives the pump 16' only when there is need. This may be done by a corresponding gearbox if the motor 17 is constantly running. With the exception of brake operations that require boosting, it is also possible to activate the motor 17 only when the wheel brakes 8, 9, 10, 11 shall be acted upon by brake pressure independently of the driver's request and, thus, of the brake pressure generator unit, for example, in the case of a TCS or ESP control intervention. A corresponding design of the central valve 5 renders it possible in the event of a TCS or ESP control intervention to have pressure fluid aspirated by the pump 16' from the pressure fluid supply reservoir 20 by way of the central valve 5 and the first hydraulic chamber 3 and to supply it to the wheel brakes 8, 9, 10, 11. For a reduction of brake pressure, the bidirectionally operating pump 16' illustrated in FIG. 1 is reversed in its direction of operation and will then deliver pressure fluid from the wheel brakes 8, 9, 10, 11 in the direction of the pressure generator unit 2. The pressure fluid may finally propagate by way of the central valve 5 until the pressure fluid supply reservoir 20.

Figure 2:
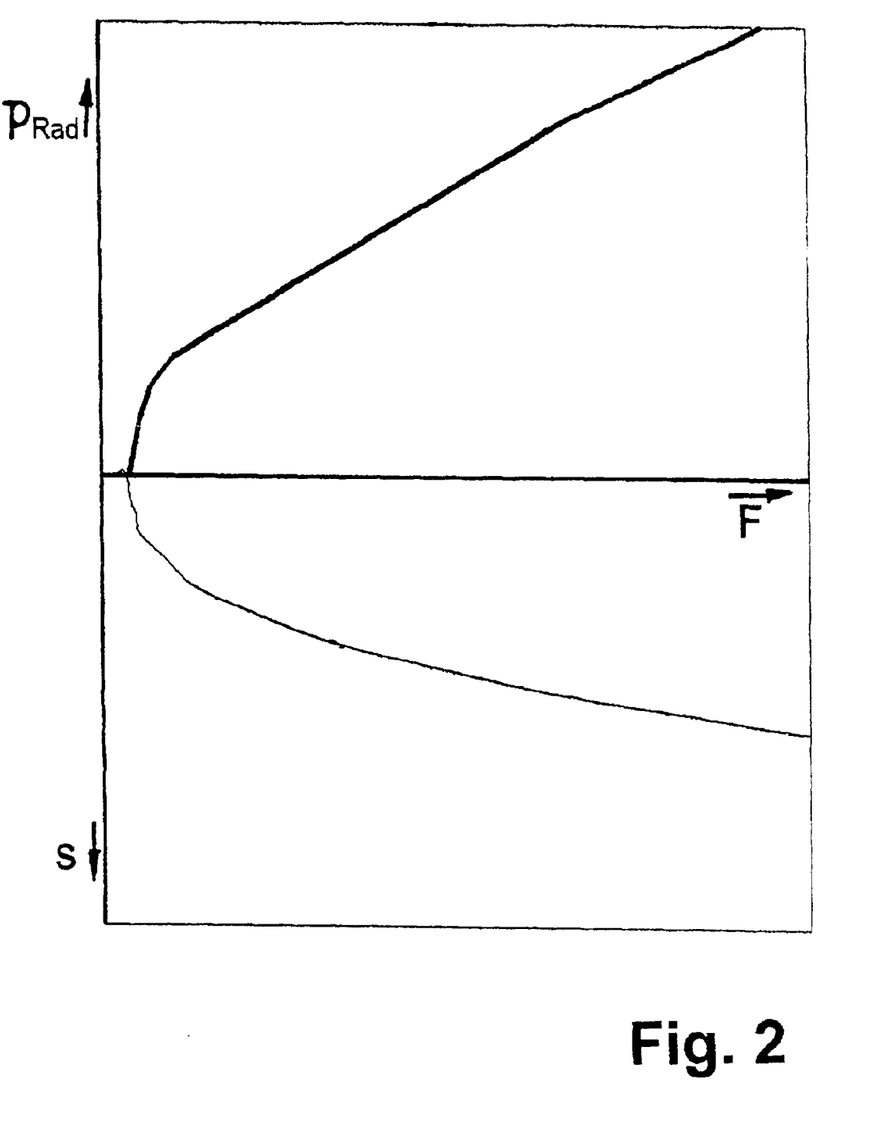
FIG. 2 is a view of the resulting brake pressure $P_{Rad}$ in the wheel brake and the actuating travel S of the brake pedal as a function of the pedal force F.

The brake pressure which results in the wheel brake $P_{Rad}$ and the actuating travel of the brake pedal S are illustrated in FIG. 2 as a function of the pedal force F. The brake pressure $P_{Rad}$ is dependent on the volume displaced from the first hydraulic chamber 3 and the volume absorption characteristic curve of the wheel brakes 8, 9, 10, 11 itself. The pedal-force/pedal-travel characteristic curve is determined by the characteristic curve of the spring 6. The pedal-force/pedal-travel characteristic curve is thus adjustable by the spring characteristic curve and the pedal-force/brake-pressure characteristic curve by means of the hydraulic configuration of the brake system and the control of the motor 17 and the pump 16' within relatively wide limits.

The following FIGS. 3 to 8 are described only insofar as there are differences compared to FIG. 1 or the respectively preceding Figures.

Figure 3:
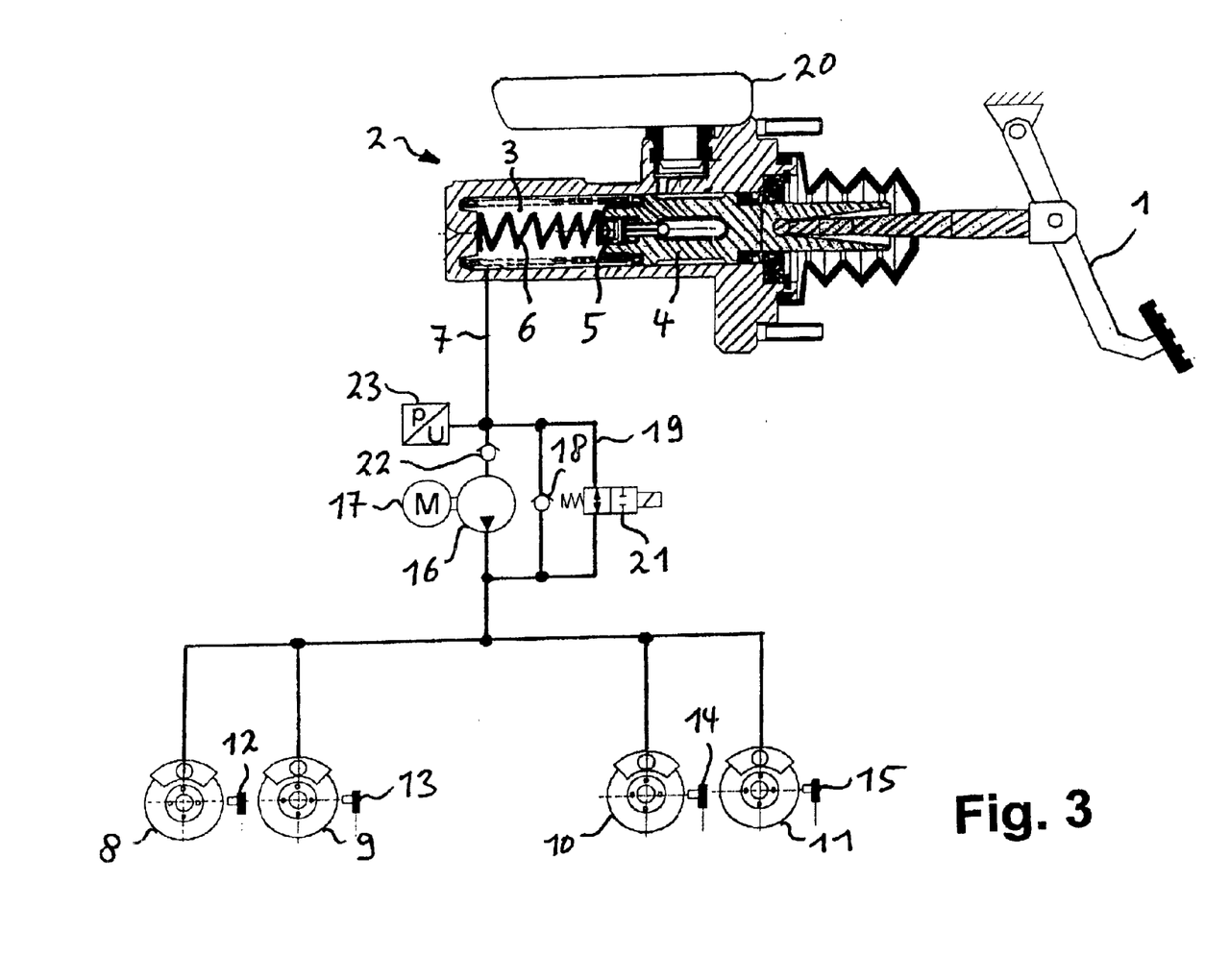
FIG. 3 is an embodiment of the brake system according to the present invention with a valve connected in parallel to the pump.

It becomes apparent from a preferred aspect of the present invention shown in FIG. 3 that the bidirectional pump 16' may be replaced by a pump 16 having one direction of operation. In this case, a valve 21, preferably an analog valve, is additionally connected in parallel to the pump 16 and the non-return valve 18. The pump inlet side includes a non-return valve 22 that opens in the direction of the pressure generator unit 2. A first pressure sensor 23 is arranged in addition in the first line 7. Herein, valve 21 controls the brake pressure increase and decrease. For reasons of control technology and for low noise effects, valve 21 is advantageously designed as an analog valve. Advantageously, pump 16 may work continuously during a brake operation because the volume flow of pressure fluid to the wheel brakes 8, 9, 10, 11 is controllable continuously by way of valve 21. The pump 16 may be the suction control type or suction throttling type. In this case, only the volume displaced out of the first chamber 3 of the pressure generator unit 2 by way of line 7 is conducted by means of the pump 16 into the wheel brakes 8, 9, 10, 11. Thus, a pressure of roughly zero bar is basically always adjusted in the first hydraulic chamber 3 according to the present invention.

Figure 4:
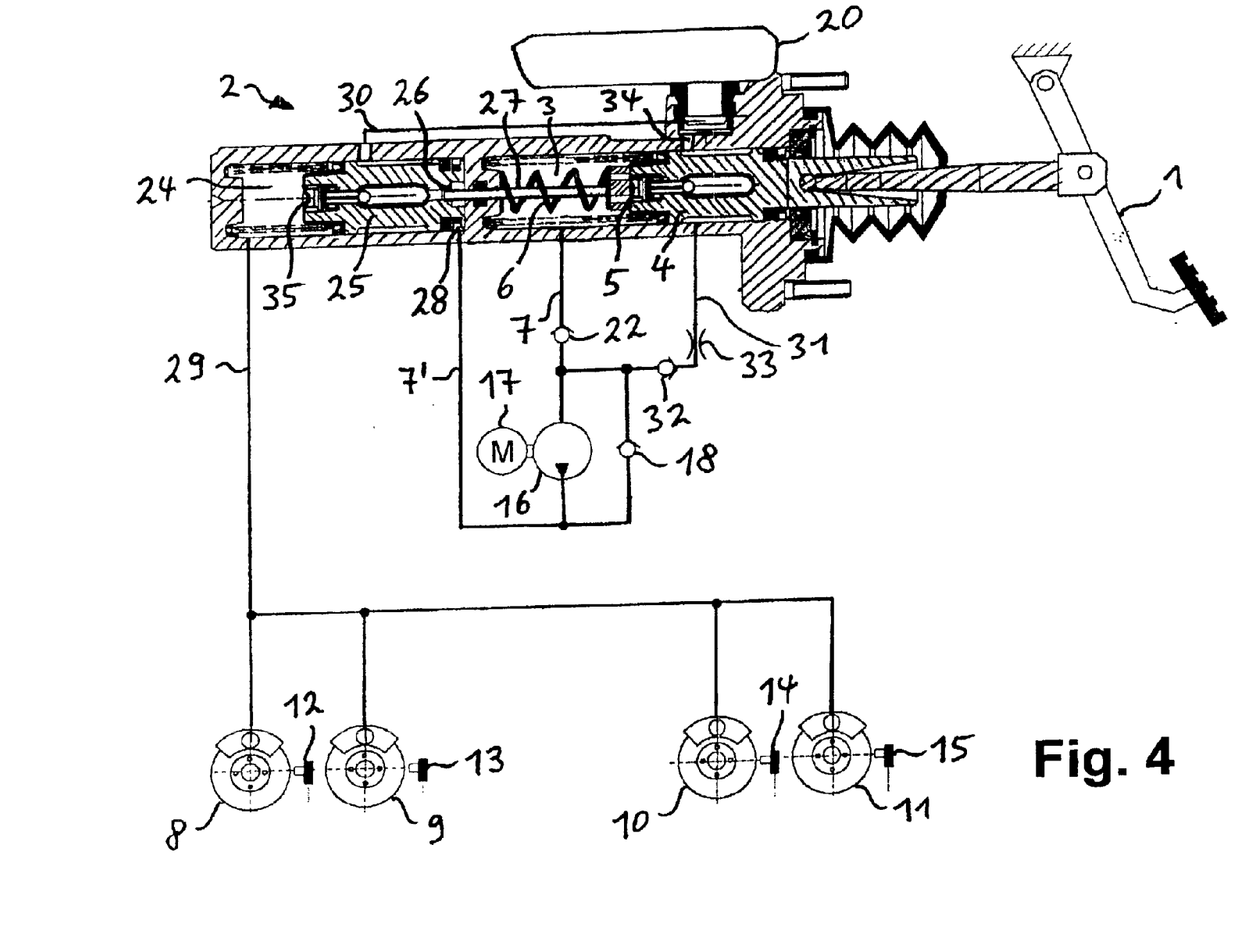
FIG. 4 is a variation using a hydraulic-mechanic position follow-up controller.

FIG. 4 differs from FIG. 3 in that associated with the brake pressure generator unit 2 is a hydraulic-mechanic position follow-up controller which includes a second hydraulic chamber 24 in which a follow-up piston 25 is housed. Placed on follow-up piston 25 is a follow-up valve 26 allocated to which is an adjusting rod 27 that is in operative engagement with the first piston 4 and the position of which changes along with the deformation of the spring 6. The third hydraulic line 7' on the pump outlet side in the direction of the wheel brakes 8, 9, 10, 11 leads into a first hydraulic piston chamber 28 separated from the second hydraulic chamber 24 by the follow-up piston 25. A fourth hydraulic line 29 leads from the second hydraulic chamber 24 to the wheel brakes 8, 9, 10, 11. Similar to the embodiments described hereinabove, the pressure fluid is delivered during a braking operation out of the first chamber 3 with the spring 6, through the line 7, to the pump 16 and then, with correspondingly boosted pressure, through the third line 7' into the first piston chamber 28. The wheel brakes 8, 9, 10, 11 are pressurized by way of line 29 by the pressure fluid volume conducted from the second hydraulic chamber 24. Herein, the pressure is controlled by means of the follow-up valve 26 which is opened by means of the adjusting rod 27 corresponding to the pressure produced by the pump, with the result that a defined volume of pressure fluid may flow back via a fifth hydraulic line 30 into the pressure fluid supply reservoir 20, and with the result that the pressure generated in the wheel brakes 8, 9, 10, 11 by way of the follow-up piston 25 and the fourth line 29 is controlled. Further, pump 16 is connected to the pressure fluid supply generator 20 by way of a sixth hydraulic line 31, into which a non-return valve 32 and a throttle 33 are inserted, and by way of a seventh hydraulic line 34. Leakage flows, such as leakage flows at the follow-up valve 26, which may lead to a loss in pressure fluid in the first piston chamber 28 can be compensated thereby. Pressure reduction is possible by way of a central valve 35 in the follow-up piston 25 and the line 30 up to the pressure fluid supply reservoir 20.

Figure 5:
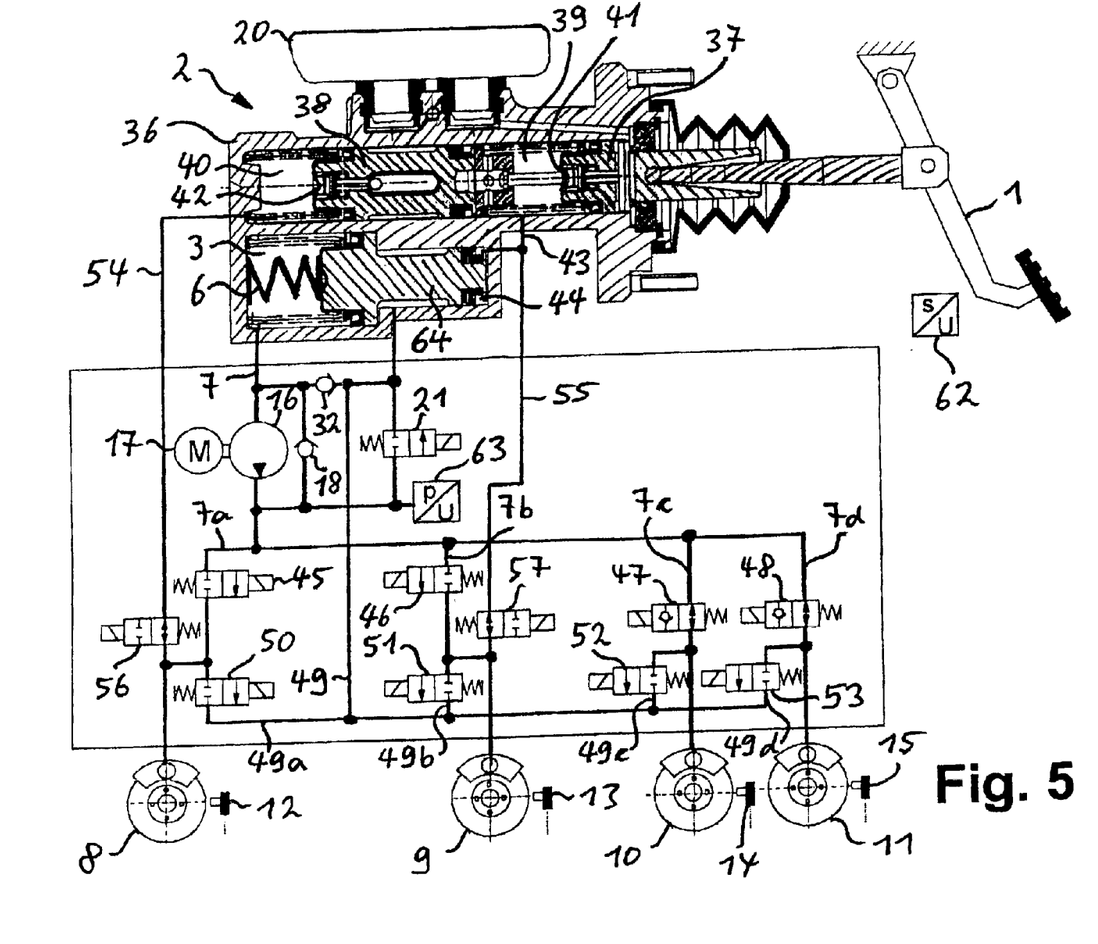
FIG. 5 is an embodiment of the brake system of the present invention, wherein the brake pressure generator unit includes a tandem master cylinder.

In FIG. 5, an embodiment of the present invention is illustrated wherein the brake pressure generator unit 2 has a tandem master cylinder 36 that is operable by the brake pd and basically includes two pressure chambers, i.e., a first master cylinder chamber 39 and a second master cylinder chamber 40, which are separated from each other by a first master cylinder piston 37 and a second master cylinder piston 38. Each master cylinder piston 37, 38 includes a central valve 41, 42. The operation of tandem master cylinders 36 of this type is not explained in detail in the present context because it is well known to the expert skilled in the respective art. A direct application of the wheel brakes 8, 9, 10, 11 by means of the pressure produced in the two brake circuits of the tandem master cylinder 36 takes place especially in emergency situations, that means in the event of failure of pump 16 or motor 17. By way of an eighth hydraulic line 43, the first master cylinder pressure chamber 39 is connected to the second hydraulic piston chamber 44 which is isolated from the first hydraulic chamber 3 that houses the elastic means 6 by the separating piston 64 (see FIG. 6) which includes a central valve 65. Thus, the separating piston 64 effects a hydraulic separation of the two tandem master brake cylinder circuits from a third brake circuit, wherein the first hydraulic chamber 3 is connected to the energy supply by the pump 16, to the connection to the pressure fluid supply reservoir 20 by way of preferably the central valve 15 (see FIG. 6), and to the rear-wheel brakes 10, 11 by way of normally open valves 47, 48, and is connectable to the front-wheel brakes 8, 9 of the vehicle by way of preferably normally closed valves 45, 46. In FIG. 5, the corresponding valves are shown which permit an ABS/TCS control of the brake pressure. The inlet valves 45, 46, 47, 48 which are inserted into the line portions 7a, 7b, 7c, 7d leading to the individual wheel brakes 8, 9, 10, 11 and succeeding the first line 7, and the outlet valves 50, 51, 52, 53 which are arranged in the line portions 49a, 49b, 49c, 49d of a ninth line 49 leading away from the wheel brakes 8, 9, 10, 11 are used for this purpose. From the pressure chambers of the first master cylinder 39 and second master cylinder 40, a tenth and an eleventh hydraulic line 54 and 55 lead to the wheel brakes 8 and 9 which are closable by way of valves 56 and 57.

In a normal braking operation, pressure fluid volume is conducted from the first master cylinder chamber 39 into the second hydraulic chamber 44, and separating piston 64 is moved in opposition to the resistance of the spring 6. Corresponding to the movement of the separating piston 64, pressure fluid is also conducted out of the first hydraulic chamber 3 and delivered to the wheel brakes 8, 9, 10, 11 by way of line 7, pump 16, and subsequent lines 7a, 7b, 7c, 7d. Inlet valves 45, 46, 47, 48 are open then. The outlet valves 50, 51, 52, 53 are closed in a normal braking operation without ABS control intervention. The control of these valves is carried out according to the known methods of electronic brake control systems such as ABS, TCS, and ESP. The brake pressure applied to second line 19 is measured by a second pressure sensor 63. All valves and motor 17 are controlled according to a driver's request for braking sensed by means of a travel sensor 62 at the actuating pedal 1 and in dependence on the pressure which C) is actually measured by the second pressure sensor 63. A good 'two-stage reaction device function' can be represented by of the travel sensor signal, this means, a defined travel/pressure characteristic curve of the system is adjusted, whereby the controllability of the brake effect in the lower range of brake pressure is improved for the driver. The valves 47 and 48 and 56 and 57, as illustrated herein, are preferably opened in the deenergized condition and ensure an emergency brake function in the event of failure of the hydraulic boosting by the pump 16 or the motor 17. The brake pressure may then be conducted from the pressure chambers of the first and second master cylinder 39, 40 by way of the lines 54, 55 to the wheel brakes 8 and 9, on the one hand, and from the first pressure chamber 3 by way of the line 7 to the wheel brakes 10 and 11 directly by application of the brake pedal 1, on the other hand. Thus, all four wheel brakes 8, 9, 10, 11 can be acted upon by the driver's foot pressure as pressure source in the event the system fails. In the event of failure of the energy supply by the pump, the entire stroke action provided by the driver to pressurize the front-axle wheel brakes is enabled by way of the circuits of the tandem master brake cylinder and, for the rear-axle wheel brakes, by way of the third brake circuit due to the separation of the hydraulic circuits. It is thus ensured that only the rear axle is affected in the event of failure of the third brake circuit and, on the other hand, failure of any other brake circuit (tandem master brake cylinder circuit) may only cause failure of the front-axle wheel brakes.

Figure 6:
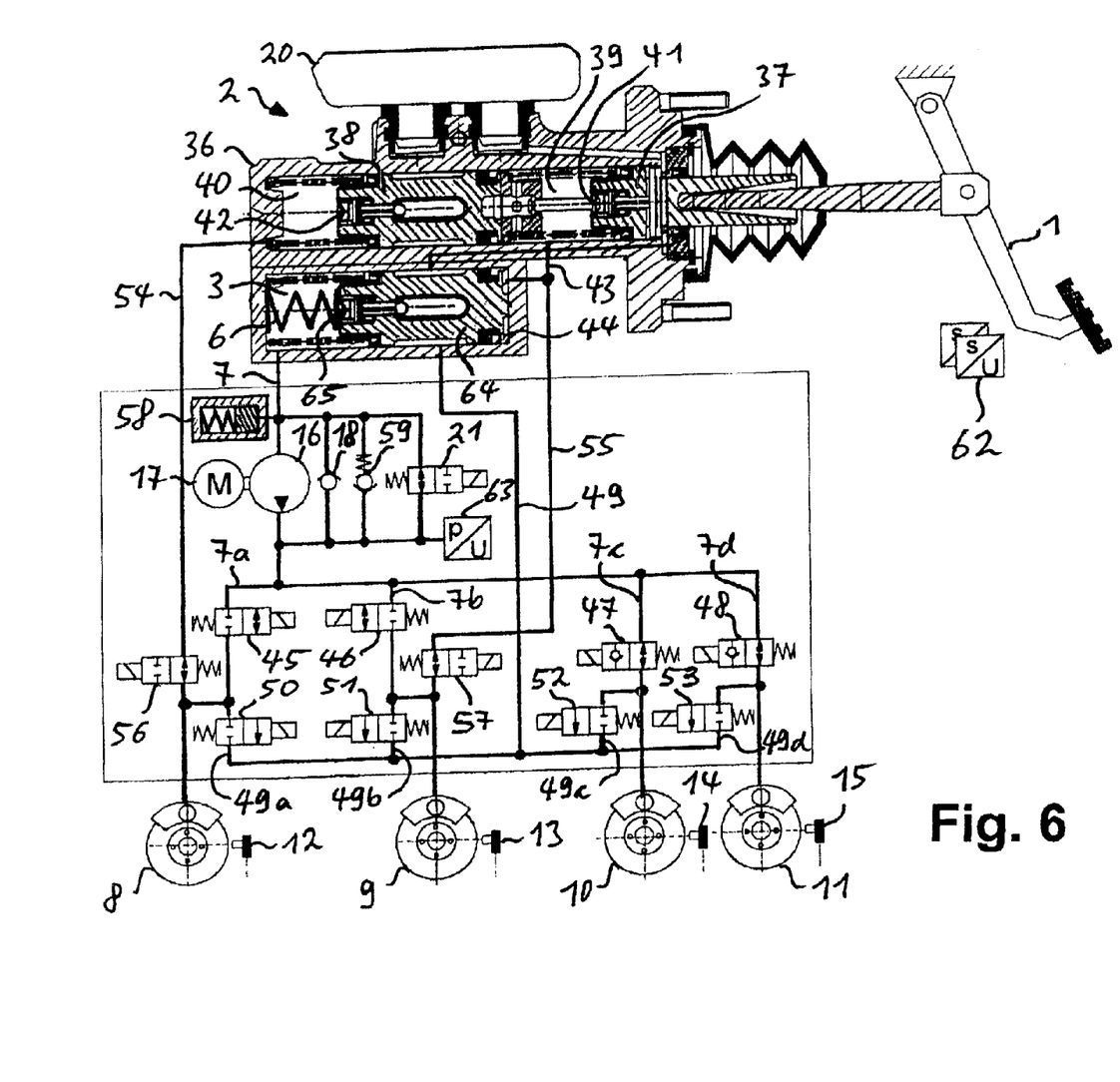
FIG. 6 is a variation of the embodiment of FIG. 5, wherein the piston of the first hydraulic chamber includes a central valve.

FIG. 6 illustrates a design corresponding to FIG. 5 wherein the separating piston 64 of the first hydraulic chamber 3 includes a central valve 5. Further, a damping chamber 58 is integrated in line 7 for damping pulsations, and a pressure-limiting valve 59 that opens in the direction of the first hydraulic chamber is arranged in parallel to valve 21, whereby a quick and reliable reduction of the pressure prevailing at the wheel brakes 8, 9, 10, 11 is achieved by way of the outlet valves 50, 51, 52, 53. This embodiment reliably ensures a slow or quick pressure increase or decrease in conformity with requirements, and a particularly effective pulsation decoupling of the actuating device 1 is additionally achieved. Besides, the wheel brakes of one axle of the vehicle are acted upon evenly, and an angular deviation due to an uneven brake pressure proportioning is avoided.

To accomplish the brake system of the present invention, only one single-circuit pump 16, three control valves 21, 50, 51, and eight switching valves 45, 46, 47, 48, 52, 53, 56, 57 are necessary in total in the case of control. A brake system of this type is basically appropriate for use in all electronic brake control systems, such as ABS, TCS, ESP, HBA (Hydraulic Brake Assistant), or ACC (Automatic Cruise Control). All four wheel brakes 8, 9, 10, 11 are operable by the driver's force when the system fails. A pressure decrease in a control phase of an electronic brake control system, for example the ABS, is possible until zero bar. The control intervention by TCS can be effected so as to be uncoupled from an actuation by the driver. In the case of an ESP control, a hydraulic connection to the pressure fluid supply reservoir 20 having a sufficiently large cross-section permits a rapid aspiration of pressure fluid so that a quick increase of high brake pressures in the wheel brakes can be realized.

Figure 7:
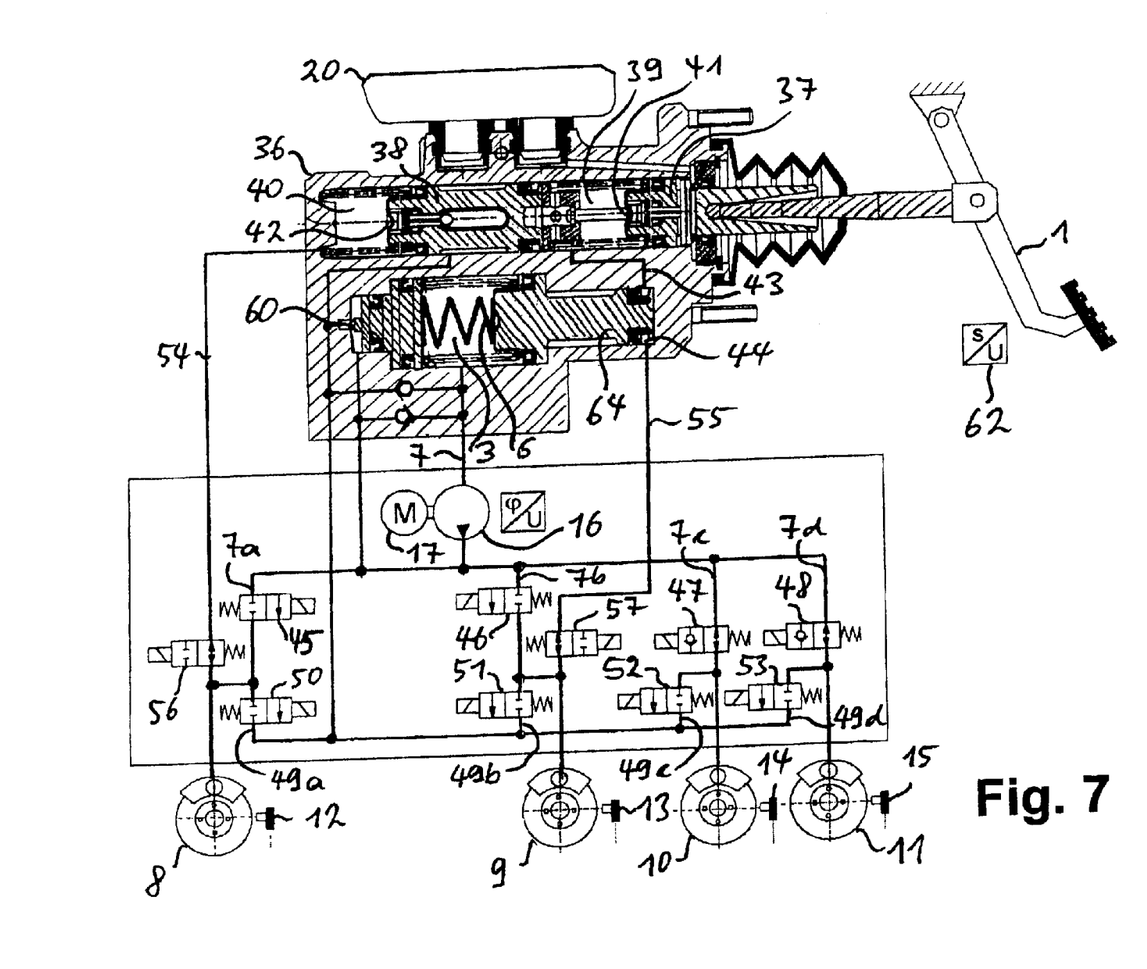
FIG. 7 is an embodiment with a tandem master cylinder, wherein a hydraulic-mechanic valve is substituted c; for the analog valve.
Figure 8:
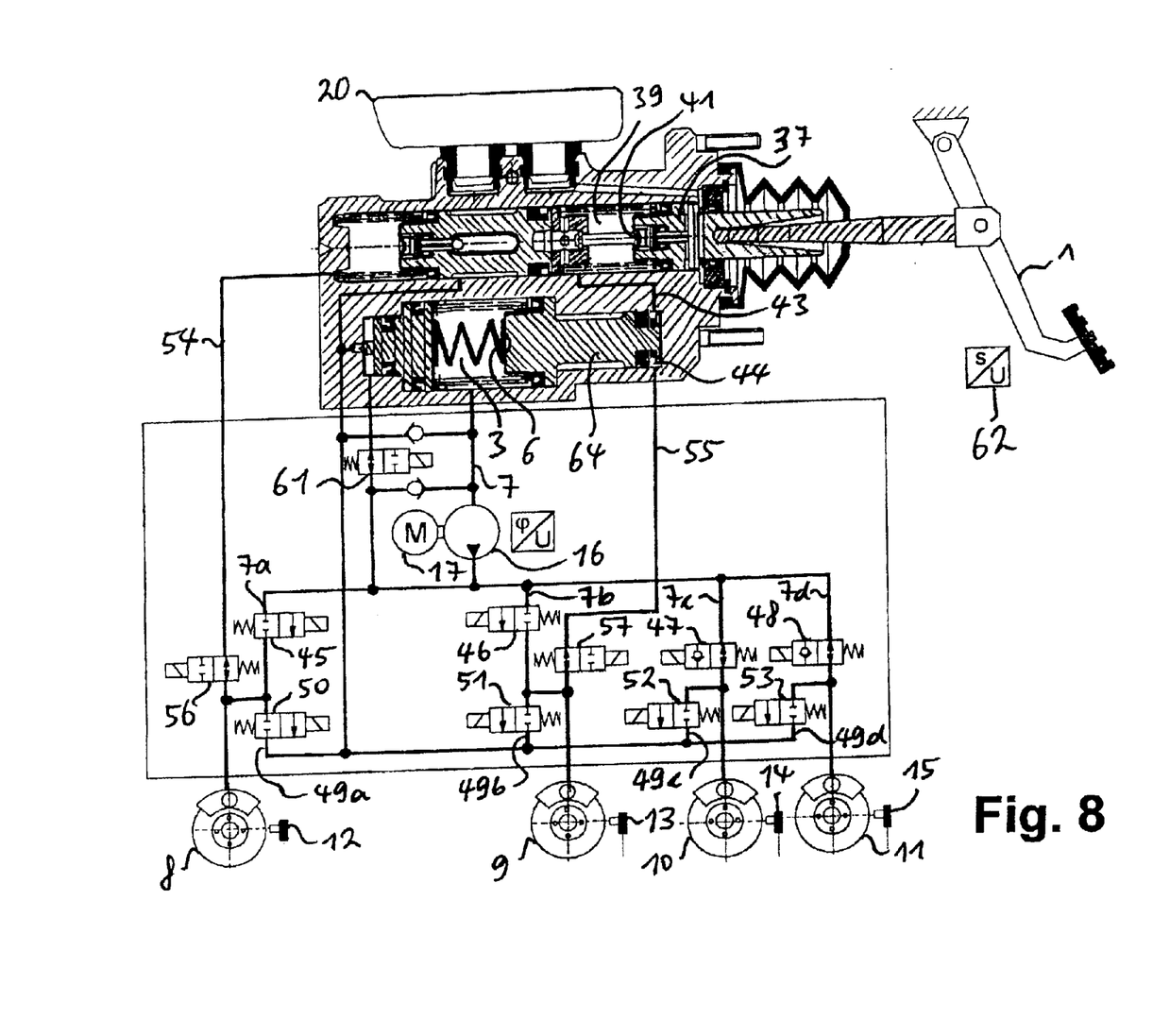
FIG. 8 is a variation of the embodiment shown in FIG. 6 with an additional valve.

FIGS. 7 and 8 show two embodiments of the present invention wherein the valve 21 is obviated and its function is performed by a hydraulic-mechanically controlled valve 60. A shut-off valve 61 is additionally inserted in the brake system shown in FIG. 8, allowing a change-over to independent actuation by the electronic brake control system for the purpose of an active braking operation in accordance with a brake control system such as TCS or ESP.

What is claimed is:
1. Hydraulic brake system, comprising:
   a brake pressure generator unit which is operable by introducing an actuating force by way of an actuating device, wherein said brake pressure generator includes a first hydraulic chamber having a volume which decreases when the brake pressure generator unit is actuated, out of which a pressure fluid volume is displaced due to the volume decrease and to which wheel brakes are connected by way of a first hydraulic connection,
   a pump coupled to said first hydraulic chamber for delivering the pressure fluid volume into said set of wheel brakes, wherein said pressure fluid volume is displaced out of the first hydraulic chamber due to the volume decrease, and wherein the first hydraulic chamber includes an elastic device disposed therein, wherein said elastic device defines a force versus travel characteristics in the actuating device when said actuating force is introduced,
   wherein the brake pressure generator unit includes a tandem master brake cylinder with two hydraulic master brake cylinder chambers, one master brake cylinder chamber thereof being connected by way of a hydraulic line to a second piston chamber in which the elastic device can be acted upon by pressure force by means of a separating piston.

2. Brake system as claimed in claim 1, wherein a second hydraulic connection is disposed between the first hydraulic chamber and the wheel brakes and houses a control valve.

3. Brake system as claimed in claim 1, wherein the brake pressure generator unit further includes a tandem master brake cylinder with two hydraulic master brake cylinder chambers, one master brake cylinder chamber thereof being connected by way of a hydraulic line to a second piston chamber in which the elastic device that is arranged in the first hydraulic chamber can be acted upon by pressure force by means of a separating piston, wherein the two master brake cylinder chambers of a tandem master brake cylinder arm connected to two front wheel brakes by way of two hydraulic lines, into which an electronically operable valve is inserted, in that there is provision of electronically operable valves between the first hydraulic chamber and the wheel brakes, and in that electronically operable valves are arranged between a ninth hydraulic line for the return of pressure fluid out of the wheel brakes.

4. Brake system as claimed in claim 1, wherein the brake pressure generator unit includes a tandem master brake cylinder with two hydraulic master brake cylinder chambers, one master brake cylinder chamber thereof being connect by way of a hydraulic line to a second piston chamber in which the elastic device that is arranged in the first hydraulic chamber can be acted upon by pressure force by means of a separating piston, wherein the two hydraulic chambers of a tandem master brake cylinder are connected to two front wheel brakes by way of two front hydraulic lines, each hydraulic front line including a electromagnetically operable, normally open separating valve, and wherein the first hydraulic chamber which includes said elastic device is connected to two rear wheel brakes by way of the hydraulic line that connects said one master brake cylinder chamber to said second piston chamber and also by way of succeeding line portions, wherein, into each is inserted an electromagnetically operable, normally open separating valve, and wherein the first hydraulic chamber is connected to the two front wheel brakes by way of the front hydraulic lines, in which separating valves, each one electromagnetically operable normally closed separating valve are inserted.

5. Hydraulic brake system, comprising:

a brake pressure generator unit which is operable by introducing an actuating force by way of an actuating device, wherein said brake pressure generator includes a first hydraulic chamber having a volume which decreases when the brake pressure generator unit is actuated, out of which a pressure fluid volume is displaced due to the volume decrease and to which wheel brakes are connected by way of a first hydraulic connection, a pump coupled to said first hydraulic chamber for delivering the pressure fluid volume into a said set of wheel brakes, wherein said pressure fluid volume is displaced out of the first hydraulic chamber due to the volume decrease, and wherein the first hydraulic chamber includes an elastic device disposed therein, wherein said elastic device defines a force versus travel characteristics in the actuating device when said actuating force is introduced, wherein the brake pressure generator unit further includes a tandem master brake cylinder with two hydraulic master brake cylinder chambers, one master brake cylinder chamber thereof being connected by way of a hydraulic line to a second piston chamber in which the elastic device that is arranged in the first hydraulic chamber can be acted upon by pressure force by means of a separating piston, wherein the two master brake cylinder chambers of a tandem master brake cylinder are connected to two front wheel brakes by way of two hydraulic lines, into which an electronically operable valve is inserted, in that there is provision of electronically operable valves between the first hydraulic chamber and the wheel brakes, and in that electronically operable valves are arranged between a ninth hydraulic line for the return of pressure fluid out of the wheel brakes.

6. Hydraulic brake system, comprising:

a brake pressure generator unit which is operable by introducing an actuating force by way of an actuating device, wherein said brake pressure generator includes a first hydraulic chamber having a volume which decreases when the brake pressure generator unit is actuated, out of which a pressure fluid volume is displaced due to the volume decrease and to which wheel brakes are connected by way of a first hydraulic connection, a pump coupled to said first hydraulic chamber for delivering the pressure fluid volume into a said set of wheel brakes, wherein said pressure fluid volume is displaced out of the first hydraulic chamber due to the volume decrease, and wherein the first hydraulic chamber includes an elastic device disposed therein, wherein said elastic device defines a force versus travel characteristics in the actuating device when said actuating force is introduced, wherein the brake pressure generator unit includes a tandem master brake cylinder with two hydraulic master brake cylinder chambers, one master brake cylinder chamber thereof being connected by way of a hydraulic line to a second piston chamber in which the elastic device that is arranged in the first hydraulic chamber can be acted upon by pressure force by means of a separating piston, wherein the two hydraulic chambers of a tandem master brake cylinder are connected to two front wheel brakes by way of two front hydraulic lines, each hydraulic front line including a electromagnetically operable, normally open separating valve, and wherein the first hydraulic chamber which includes an said elastic device is connected to two rear wheel brakes by way of the hydraulic line that connects said one master brake cylinder chamber to said second piston chamber line and also by way of succeeding line portions, wherein, into each is inserted an electromagnetically operable, normally open separating valve, and wherein the first hydraulic chamber is connected to the two front wheel brakes by way of the front hydraulic lines, in which separating valves, each one electromagnetically operable normally closed separating valve are inserted.

* * * * *

UNITED STATES PATENT AND TRADEMARK OFFICE
CERTIFICATE OF CORRECTION

PATENT NO. : 6,851,763 B1
DATED : February 8, 2005
INVENTOR(S) : Feigel

It is certified that error appears in the above-identified patent and that said Letters Patent is hereby corrected as shown below:

Column 9,
Line 16, change "arm connected to two" to -- are connected to two --
Line 26, change "thereof being connect by" to -- thereof being connected by --

Signed and Sealed this

Twenty-fourth Day of May, 2005

JON W. DUDAS
*Director of the United States Patent and Trademark Office*